Jan. 23, 1962     L. F. WARNOCK, JR     3,018,142
CONTROL APPARATUS

Filed Feb. 21, 1961     2 Sheets-Sheet 2

*INVENTOR.*
LYLE F. WARNOCK JR.
BY Roger W. Jensen
ATTORNEY

United States Patent Office 3,018,142
Patented Jan. 23, 1962

3,018,142
CONTROL APPARATUS
Lyle F. Warnock, Jr., Grand Rapids, Mich., assignor to Minneapolis-Honeywell Regulator Company, Minneapolis, Minn., a corporation of Delaware
Filed Feb. 21, 1961, Ser. No. 90,682
6 Claims. (Cl. 308—9)

This invention pertains generally to an improved rotational support for sensitive instruments and has special although not exclusive application to the field of floated inertial instruments such as floated integrating gyroscopes and floated accelerometers.

In sensitive instruments of the floated type, a gimbal is provided within a housing. A viscous fluid is disposed around the gimbal within the housing. Usually the viscous fluid is selected so as to have a density substantially the same as the density of the gimbal so as to substantially float the gimbal. Bearing means are provided for defining a rotational axis for relative rotation between the gimbal and the housing, this axis usually being identified as the output axis (OA). Floated instruments are extremely accurate, the accuracy of these devices being largely dependent on the friction level in the bearings between the gimbal and the housing.

Various arrangements have been used for reducing or minimizing the friction between the gimbal and its support or housing. Various hydrostatic techniques have been used for pumping the fluid so that it flows between the gimbal and the housing in a manner so as to provide rotational support. One example of a prior art arrangement is the Cosgriff et al. Patent 2,591,921, granted April 8, 1952.

Generally the prior art hydrostatic gimbal supports have suffered from the disadvantage of being quite susceptible to contamination in the fluid. More specifically, the contamination has resulted in clogging of the narrow passageways for fluid flow with the resulting decrease in bearing efficiency or in some cases complete inoperativeness of the entire instrument.

The present invention provides a hydrodynamic rotational support for a sensitive instrument which overcomes the disadvantage of the prior art hydrostatic supports. The present invention has eliminated the contamination problem and further has the advantage of less complexity as compared to the prior art arrangements. The present invention provides a two-element bearing for a rotational support of a first member relative to a second member. The bearing includes a pivot receiving element connected to one of the members and having a recess. The bearing further includes a pivot element connected to the other of the members and having at least a portion thereof adapted to be positioned in the recess. The bearing elements are so dimensioned that a radial gap is defined therebetween, the radial gap changing in dimension as a function of the axial extent of the bearing elements. For one direction of axial movement the radial gap decreases. The decreasing radial gap may be accomplished in various manners, one arrangement being to have a tapered pivot coacting with a cylindrically shaped recess, and another arrangement being a stepped pivot coacting with a cylindrically shaped recess. The invention further provides means for axially oscillating the two bearing elements relative to one another and the invention also provides means for pumping fluid means between the elements axially and only in the direction of the decreasing radial gap. In the embodiments shown the means for axially oscillating the two bearing elements also provide the pumping mechanism. By providing a unidirectional flow of fluid in the direction of the reduced gap, a positive bearing rotational support is achieved. By simultaneously axially oscillating the two bearing elements, the contamination problem is overcome.

An object of this invention therefore is to provide an improved control apparatus.

Another object of the invention is to provide an improved hydrodynamic support for a sensitive instrument.

Still another object of the invention is to provide a hydrodynamic support for a sensitive instrument including two bearing elements, one positioned within a recess in the other, and with a radial gap defined therebetween which varies in an axial sense in combination with means for axially oscillating the two bearing elements relative to one another and for providing a unidirectional flow of fluid axially between the bearing elements in the direction of reduced gap.

Other objects of the invention will become more apparent from a reading of the following detailed description and appended claims in conjunction with the drawings in which:

FIGURE 1 is a cross-sectional view of a floated instrument utilizing the present invention, the instrument being shown somewhat schematically;

FIGURES 2 and 3 are views of the instrument shown in FIGURE 1 as viewed along section lines 2—2 and 3—3;

FIGURE 4 is a view of an alternate bearing arrangement;

FIGURE 5 is a schematic representation of the bearing element shown in FIGURE 4; and FIGURE 6 is a schematic representation of one of the bearing elements shown in FIGURE 1.

Figure 1:
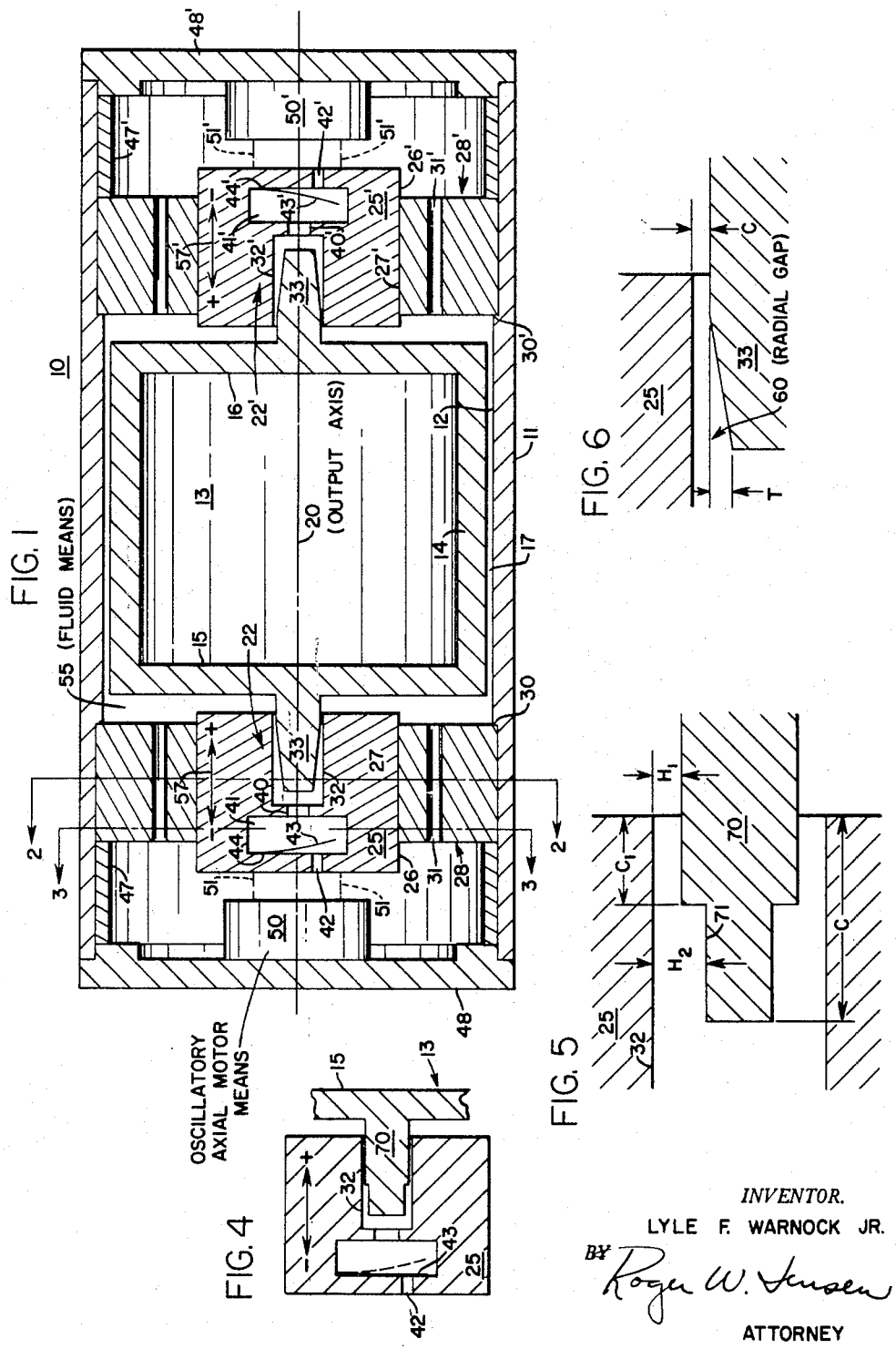
Figure 2:
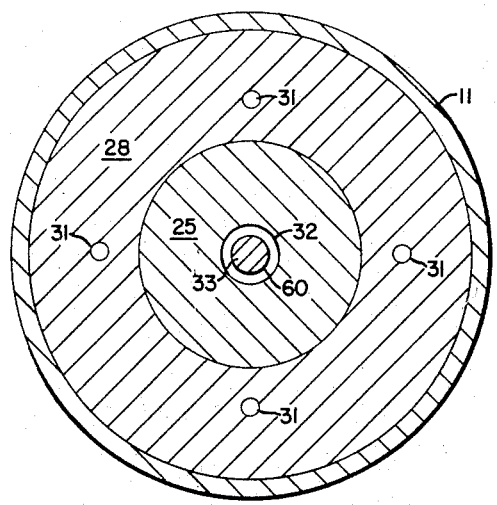

Referring to FIGURE 1, the reference numeral 10 generally designates a sensitive instrument and comprises a hollow cylindrical housing member 11 having an inner bore 12. A gimbal member 13 is positioned within the housing 11 and is depicted as being a hollow cylindrical shell 14 with a pair of end members 15 and 16 closing off the ends thereof. Generally the gimbal housing 14 has a circular cross section, the outer diameter of which is slightly less than the inner diameter 12 of the housing member 11 so that a damping gap 17 is defined between the gimbal and the housing. Suitable means, not shown, would be positioned within the gimbal 13 according to its intended use; for example, in the case of a floated integrating gyroscope, a suitable gyro spin motor would be mounted within the gimbal 13 having a spin reference axis perpendicular to the longitudinal axis of the gimbal. In the case of a linear accelerometer the gimbal 13 would be made pendulous with respect to its rotational axis to be described in greater detail below.

Suitable means are provided for rotatably connecting the gimbal member 13 to the housing member 11 for rotation about an output axis 20. More specifically, the connection means includes a pair of axially spaced bearing assemblies 22 and 22'. Generally, the bearing assemblies 22 and 22' are identical to one another and accordingly a detailed description of the bearing assembly 22 will be presented, it being understood that elements in the bearing assembly 22' will be identified by the same reference numeral as the corresponding elements in the bearing assembly 22 except for the addition of a prime mark (') thereto.

The bearing assembly 22 includes a pivot receiving element generally identified by the reference numeral 25. The pivot receiving element is depicted as having a generally cylindrical shape with an outer surface identified by the reference numeral 26. The pivot receiving element 25 is adapted to be positioned within a suitable circular bore 27 in a support plate 28. The support plate 28 in turn is securely positioned within the housing member 11 by being abutted against a shoulder 30 thereof. A plurality of axially extending ports 31 are provided in the support 28 for purposes to be explained below.

Figure 3:
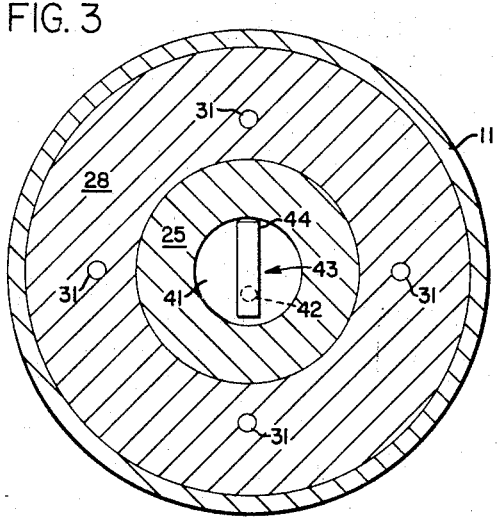

The pivot receiving element 25 further includes a central recess 32, the recess 32 being a circular bore extending axially along the pivot receiving element 25 for a sufficient distance so that it may receive a substantial portion of a tapered pivot element 33 which, in turn, is suitably attached or connected to the gimbal member 13. The bore 32 is located so as to be concentric with the output axis 20 above described. The tapered pivot element 33 will be described in greater detail in connection with FIGURE 6 and it too is located concentrically with respect to the output axis 20. The bore 32, as depicted in FIGURE 1, begins on the right-hand side of the pivot receiving element 25 and extends to the left to a point where an inwardly extending shoulder 40 is provided. Immediately to the left of the shoulder 40 is a chamber 41 depicted as having a circular cross section (see FIGURE 3). A suitable port 42 connects the chamber 41 with the left-hand side of the pivot receiving element 25. A flexible resilient reed member 43 is provided within the chamber 41 and is connected at one end as at 44 to the pivot receiving element 25. The reed member 43 is adapted, under certain conditions, to be displaced from the position shown in FIGURE 1 to a position where it abuts against the left side of the chamber 41 and is oriented relative to the port 42 so that it seals off the port 42 when in said displaced position. The relationship between the reed 43 and the port 42 can be conveniently observed in FIGURE 3.

The support member 28 is maintained in position by being axially abutted by a suitable sleeve member 47 which, in turn, is abutted axially by a suitable cover member 48 which generally seals off the left end of the housing member 11.

A suitable means is provided for axially oscillating the pivot receiving element 25 relative to the pivot element 33. Various arrangements may be provided, it being understood that the specific arrangement depicted is merely one embodiment and that the scope of the invention is not limited to said embodiment. The embodiment depicted includes a suitable motor means 50 attached centrally to the inside surface of the cover plate 48 and shown schematically. The motor means 50 may be of any suitable type such as electromagnetic, electrostrictive, etc. A suitable mechanical connection schematically identified by the reference numeral 51 connects the motor means 50 to the pivot receiving element 25. The motor means 50 functions to impart an axial oscillatory motion to the pivot receiving element 25 relative to the housing 11 (and accordingly also relative to the axially stationary gimbal member 13).

Fluid means 55, such as a viscous damping fluid, is adapted to be positioned within the housing 11 so as to surround the gimbal 13 including the gap 17. The fluid means 55 is adapted to fill all voids within the housing including the recess 32, chamber 41, and ports 31 and 42.

The clearances depicted between the pivot receiving element 25 and the pivot element 33 as well as the taper on the pivot element 33 are greatly exaggerated in FIGURE 1 as well as in FIGURE 6. Generally, the clearances are made as small as possible consistent with mechanical practice so as to obtain maximum radial support of the gimbal. In FIGURE 6 the dimension C represents the minimum radial clearance between the pivot element 33 and the pivot receiving element 25. The taper of the pivot element 33 is represented in FIGURE 6 by the dimension T. A radial clearance of approximately .001 inch for the dimension C has been found satisfactory. Further, for maximum radial support the ratio $T/C$ should be approximately 1.

*Operation*

The present invention functions to provide a rotational support for the gimbal 13 by a hydrodynamic action. As indicated, the motor means 50 functions to axially oscillate the pivot receiving element 25 along the output axis 20 relative to the housing 11. Since the gimbal 13 remains relatively axially fixed with respect to the housing 11, it follows that the oscillatory motion of the pivot receiving element 25 will also be with respect to the pivot element 33. The total axial travel of the pivot receiving element 25, as well as the frequency of oscillation, is not critical but depends on the various parameters of the bearing assembly, the important point being that a sufficient fluid flow has to be produced to accomplish the desired radial support of the pivot element 33. In FIGURE 1 a bidirectional arrow 57 is depicted having a positive direction and a negative direction simulating the two senses of axial movement of the bearing receiving element 25. When the bearing receiving element 25 moves in the indicated positive direction (to the right as shown in FIGURE 1), the relative axial movement between the bearing elements 25 and 33 will tend to increase the pressure within the chamber 41 closing off the reed valve arrangement including the reed 43 and its coacting port 42. The closing of the reed valve will result in fluid 55 within the recess 32 being moved axially to the right as shown in FIGURE 1 relative to the pivot element 33. In FIGURE 6 the radial gap between the pivot element 33 and the pivot receiving element 25 is generally identified by the reference numeral 60. Due to the taper of the pivot 33 it follows that the radial gap decreases in dimension along the axis from left to right as viewed in FIGURE 6 as well as FIGURE 1. Thus the movement of the pivot receiving element 25 in the positive direction causes a flow of fluid relative to the pivot element 33 in the direction of decreasing radial gap.

When the bearing receiving element 25 reverses its sense of axial movement and moves in the negative direction, the reed valve 43—42 will open tending to equalize the pressure across the tapered pivot element 33. There will be substantially no flow of fluid relative to the pivot 33 for this part of the cycle. Thus a net unidirectional flow of fluid in the direction of decreasing radial gap is produced by the mechanism depicted. The unidirectional flow of fluid only in the direction of decreasing radial gap in turn produces a positive centering force on the pivot element 33. It is important to have the flow of fluid only in the direction of decreasing radial gap. It can be shown that a flow in the direction of increasing radial gap will develop decentering forces which is not desirable for a rotational support.

It will be understood that a complete path for fluid flow must be provided between the opening of the recess 32 and the inlet port 42, this being depicted by the ports 31. As explained, various arrangements may be provided for axially oscillating the bearing receiving element 25. One such arrangement includes mounting the element 25 directly on an electrostrictive motor means.

*Description of FIGURES 4 and 5*

An alternate support arrangement is shown in FIGURE 4, the main difference being that the pivot element connected to the gimbal has a stepped configuration instead of a tapered configuration. The end wall 15 of the gimbal 13 is shown and connected thereto is a pivot element 70 adapted to fit within the recess 32 of the pivot receiving element 25. Generally, the pivot receiving element 25 of FIGURE 4 is identical to that shown in FIGURE 1. In FIGURE 4 the reed member 43 is shown in the position closing off the port 42. The stepped pivot 70 is shown in greater detail in FIGURE 5. The minimum radial clearance between the pivot element 70 and the pivot receiving element 25 is identified by $H_1$ and the radial clearance between a reduced portion 71 of the pivot element 70 is designated $H_2$. The total axial extent of the pivot element 70 within the bore 32 is identified by the dimension C. The dimension $C_1$ designates the axial extent from the shoulder between the pivot 70 and its reduced section 71 to the right-hand surface of the pivot receiving element 25. The effect of having a stepped pivot 70 is analogous to the tapered pivot 33 above described to the extent that there is a change in the radial gap as a function of the axial extent of pivot. It has been found that a stepped pivot will provide greater radial support as compared to the same amount of pressure drop coacting with a tapered pivot. Again the clearances between the pivot element and the pivot receiving element should be as small as possible consistent with mechanical practice. One arrangement which has been found satisfactory is to have the dimension $H_1$ approximately .001 inch and by having the dimension $H_2$ .002 inch. In addition, maximum radial support will be obtained if the ratio of $H_2/H_1$ is approximately 2. Further, it can be shown that optimum results are obtained if the dimension $C_1$ is approximately .111C.

The theory of operation of the apparatus depicted in FIGURES 4 and 5 is generally similar to that above in connection with FIGURE 1. The pivot receiving element 25 is adapted to have an oscillatory axial movement imparted to it by suitable means which in effect causes relative oscillatory axial movement between it and the stepped pivot element 70. For positive relative movements fluid is caused to flow in the direction of decreasing radial gap while for negative directions of relative movement there is substantially no flow of fluid and accordingly a net positive radial support is provided for the pivot element 70.

While the pivot receiving element has been shown connected to the housing and the pivot element has been shown connected to the gimbal, it will be understood that the reverse arrangement could be used and is within the scope of the invention.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. In a floated inertial instrument: a housing member; a gimbal member positioned within said housing member; fluid means in said housing member and surrounding said gimbal member, said fluid means having a density substantially equal to the density of said gimbal member; and means rotatably connecting said gimbal member to said housing member for relative rotation therewith about an axis comprising a pair of axially spaced bearing assemblies each including a pivot receiving element connected to one of said members and having a recess, a pivot element connected to the other of said members and having at least a portion thereof positioned in said recess, a radial gap being defined between said elements, and said radial gap decreasing in dimension along said axis, means for axially oscillating said elements relative to one another and for pumping said fluid means between said elements only in the direction of decreasing radial gap.

2. In a floated inertial instrument: a housing member; a gimbal member positioned within said housing member; fluid means in said housing member and surrounding said gimbal member, said fliud means having a density substantially equal to the density of said gimbal member; and means rotatably connecting said gimbal member to said housing member for relative rotation therewith about an axis comprising a pair of axially spaced bearing assemblies each including a pivot receiving element connected to one of said members and having a cylindrical recess, a tapered pivot element connected to the other of said members and having at least a portion thereof positioned in said recess, a radial gap being defined between said elements, and said radial gap decreasing in dimension along said axis, means for axially oscillating said elements relative to one another, and means for pumping said fluid means between said elements only in the direction of decreasing radial gap.

3. In a floated inertial instrument: a housing member; a gimbal member positioned within said housing member; fluid means in said housing member and surrounding said gimbal member, said fluid means having a density substantially equal to the density of said gimbal member; and means rotatably connecting said gimbal member to said housing member for relative rotation therewith about an axis comprising a pair of axially spaced bearing assemblies each including a pivot receiving element connected to one of said members and having a cylindrical recess, a stepped pivot element connected to the other of said members and having at least a portion thereof positioned in said recess, a radial gap being defined between said elements, and said radial gap decreasing in dimension along said axis, means for axially oscillating said elements relative to one another, and means for pumping said fluid means between said elements only in the direction of decreasing radial gap.

4. In a floated inertial instrument: a housing member; a gimbal member positioned within said housing member; fluid means in said housing member and surrounding said gimbal member; and means rotatably connecting said gimbal member to said housing member for relative rotation therewith about an axis comprising a pair of axially spaced bearing assemblies each including a pivot receiving element connected to one of said members and having a recess, a pivot element connected to the other of said members and having at least a portion thereof positioned in said recess, a radial gap being defined between said elements, and said radial gap decreasing in dimension along said axis, means connected to one of said elements for axially oscillating said elements relative to one another, and means for pumping said fluid means between said elements substantially only in the direction of decreasing radial gap.

5. In a sensitive instrument: a first member; a second member; and means rotatably connecting said second member to said first member for relative rotation therewith about an axis comprising a pivot receiving element connected to one of said members and having a recess, a pivot element connected to the other of said members and having at least a portion thereof positioned in said recess, a radial gap being defined between said elements, and said radial gap decreasing in dimension along said axis, fluid means in said gap, and means for axially oscillating said elements relative to one another and for pumping said fluid means between said elements only in the direction of decreasing radial gap.

6. In a sensitive instrument: a first member; a second member; and means rotatably connecting said second member to said first member for relative rotation therewith about an axis comprising a pair of axially spaced bearing assemblies each including a pivot receiving element connected to one of said members and having a recess, a pivot element connected to the other of said members and having at least a portion thereof positioned in said recess, a radial gap being defined between said elements, and said radial gap decreasing in dimension along said axis, fluid means in said gap, means for axially oscillating said elements relative to one another, and means tor pumping said fluid means between said elements only in the direction of decreasing radial gap.

References Cited in the file of this patent

UNITED STATES PATENTS 2,746,813     Massa     May 22, 1956